(12) United States Patent
Loveless et al.

(10) Patent No.: US 9,494,243 B2
(45) Date of Patent: Nov. 15, 2016

(54) TEMPERATURE CONTROL VALVE ACTUATOR ASSEMBLY

(71) Applicant: PROFIRE ENERGY, INC, Lindon, UT (US)

(72) Inventors: Mark R. Loveless, Mapleton, UT (US); Melvin Hal Parks, Pleasant Grove, UT (US); Justin W. Hatch, Spanish Fork, UT (US)

(73) Assignee: Profire Energy, Inc, Lindon, UT (US)

( * ) Notice: Subject to any disclaimer, the term of this patent is extended or adjusted under 35 U.S.C. 154(b) by 21 days.

(21) Appl. No.: 14/470,891

(22) Filed: Aug. 27, 2014

(65) Prior Publication Data

US 2015/0059875 A1    Mar. 5, 2015

Related U.S. Application Data

(60) Provisional application No. 61/870,691, filed on Aug. 27, 2013, provisional application No. 61/870,776, filed on Aug. 27, 2013.

(51) Int. Cl.
| | |
|---|---|
| *F16K 27/08* | (2006.01) |
| *F16K 27/00* | (2006.01) |
| *F16K 41/02* | (2006.01) |
| *F16K 31/04* | (2006.01) |
| *G05D 16/20* | (2006.01) |
| *G05D 7/06* | (2006.01) |

(52) U.S. Cl.
CPC ............ *F16K 27/00* (2013.01); *F16K 31/04* (2013.01); *F16K 41/02* (2013.01); *G05D 7/0635* (2013.01); *G05D 16/202* (2013.01); *F16K 27/08* (2013.01); *Y10T 137/7758* (2015.04); *Y10T 137/7761* (2015.04)

(58) Field of Classification Search
CPC ........ F16K 27/00; F16K 27/08; F16K 41/02; F16K 31/04; Y10T 137/7758; Y10T 137/776; Y10T 137/7761; Y10T 137/2705; G05D 16/202; G05D 7/0635

USPC ................... 137/487, 487.5, 87.04
See application file for complete search history.

(56) References Cited

U.S. PATENT DOCUMENTS

| | | | | |
|---|---|---|---|---|
| 1,736,405 | A * | 11/1929 | Houser | F16K 41/02 251/366 |
| 2,399,938 | A * | 5/1946 | Pett | G05D 7/0193 137/487 |
| 2,588,212 | A * | 3/1952 | Custer | F16K 7/06 251/5 |
| 2,619,104 | A * | 11/1952 | Temple | G05D 16/0619 137/86 |
| 2,882,008 | A * | 4/1959 | Giauque | D21G 1/0266 251/145 |
| 3,234,818 | A * | 2/1966 | Cantalupo | F16K 31/04 192/114 R |
| 3,335,740 | A * | 8/1967 | Anderson | F16K 31/04 137/236.1 |
| 3,648,718 | A * | 3/1972 | Curran | F16K 1/465 137/269 |
| 3,706,320 | A * | 12/1972 | Kalsi | F16K 31/365 137/454.6 |
| 3,720,227 | A * | 3/1973 | Curran | F16K 1/465 137/338 |
| 5,076,890 | A * | 12/1991 | Balembois | G05D 7/0635 162/198 |
| 5,251,148 | A * | 10/1993 | Haines | G05D 7/0635 137/487.5 |
| 5,680,880 | A * | 10/1997 | Miyake | F16K 31/04 137/338 |
| 5,699,664 | A * | 12/1997 | LaFleur | F01N 3/22 137/455 |
| 9,291,280 | B2 * | 3/2016 | McCarty | F16K 27/08 |

\* cited by examiner

*Primary Examiner* — William McCalister
(74) *Attorney, Agent, or Firm* — Clegg PC; Perry S. Clegg (57) ABSTRACT

A control valve actuator assembly having internally configured pressure transducers and associated pressure channels internally integrated within the yoke of the actuator assembly.

13 Claims, 12 Drawing Sheets

TEMPERATURE CONTROL VALVE ACTUATOR ASSEMBLY

PRIORITY

The present application claims the benefit under 35 U.S.C. §119 (e) of each of U.S. Provisional Patent Application Ser. No. 61/870,691 entitled "Temperature Control Valve Actuator Assembly" filed on Aug. 27, 2013 and U.S. Provisional Patent Application Ser. No. 61/870,776 entitled "Dual Cartridge Temperature Control Valve" filed on Aug. 27, 2013, each of which is incorporated herein by reference in its entirety.

THE FIELD OF THE INVENTION

The present invention relates to actuators for control valves for use in a valve train. More specifically, the present invention relates to an actuator assembly for temperature control valves used in a valve train for a combustion application at an oil or gas well site.

BACKGROUND

Combustion applications are commonly used at oil and gas well sites in association with heater tanks, separators, treaters, amine re-boilers, and line heaters. Fuel being supplied to a burner unit or pilot in a combustion application is commonly channeled through a valve train before the fuel reaches the combustion site.

The valve train is used for, among other things, directing the fuel to the combustion application, straining or removing contaminants from the fuel, regulating gas pressure, regulating temperature at the combustion site, and controlling fuel flow. Gas valve trains may include a number of components such as pipe nipple, a Y-strainer, a regulator, safety shut-off valves, one or more control valves, gauges, manual shut-off valves, and various pressure sensors, pressure switches, and test points, to name but a few parts.

A control valve is an important part of the valve train because it may be used to regulate fuel flow in response to changes in fuel pressure or changes in temperature levels at the combustion site. Opening and closing of a control valve is commonly accomplished using an actuator assembly, which may be disposed above or adjacent the control valve.

There are a number of disadvantages to actuator assemblies for control valves currently used in the industry. One disadvantage is that many control valve actuators are large and heavy and can be cumbersome. Another disadvantage is that some control actuator components require configuring concurrently with installation of the control valve and associated actuator assembly in the valve train, increasing the amount of time to install or replace a control valve.

Another disadvantage to control valve actuator assemblies commonly used in the industry is that some externally connected components, such as wiring, pressure transducers and associated pressure conduits, or pressure tubes, may be exposed to weather and unwanted contact such as jarring or bumping and therefore may be more susceptible to breaking or wear out quickly. Externally configured components may need to be explosion proof and therefore more costly to manufacture.

Also, the electrical wiring configuration for many control valve actuator assemblies currently in the industry can be complex and require configuring multiple connection points.

Another disadvantage to many control valve actuator assemblies in the industry is that, if they have visual indicators for proof of closure, the indicators can be difficult to read making it challenging to know whether full closure of a control valve has been accomplished.

Thus, it is thus desirable to have an improved control valve actuator assembly that is lighter and more compact in size, simple in construction, improves the life of pressure transducers and associated components for pressure conduits or pressure tubes, and reduces the manufacturing costs.

SUMMARY OF THE INVENTION

It is an object of the present invention to provide an improved actuator assembly for a temperature control valve.

According to one aspect of the invention, a control valve actuator assembly is provided comprising a motor, a driver control, an actuator rod, an actuator base, an actuator yoke, one or more pressure transducers, and an explosion proof housing cover. In accordance with another aspect of the present invention, the actuator motor is a direct driver motor or a stepper motor.

In accordance with another aspect of the present invention, one or more pressure transducers are internally configured so as to be disposed to the base or yoke inside of the explosion proof housing cover. In another aspect of the present invention, the yoke legs may be configured with internal pressure channels or pressure ports to permit the pressure transducers to sense pressure or receive information regarding pressure from a control valve assembly through the internal pressure channels or pressure ports. The control valve actuator of the present invention may have no external tubing or wiring.

According to another aspect of the present invention, the control valve actuator assembly may include integrated internal wiring to allow for single point connection for all electronic components of the actuator assembly.

In accordance with another aspect of the present invention, control valve actuator components enclosed within the explosion proof housing, such as the transducers, the motor, the control driver, and the wiring, do not need to be explosion proof because they are protected by the explosion proof housing cover.

In accordance with another aspect of the present invention, the control valve actuator assembly includes a lever pivoting indicator arm that provides for greater visibility of measurement of the closed and open positions of the control valve.

These and other aspects of the present invention are realized in a control valve actuator assembly as shown and described in the following figures and related description.

BRIEF DESCRIPTION OF THE DRAWINGS

Various embodiments of the present invention are shown and described in reference to the numbered drawings wherein.

It will be appreciated that the drawings are illustrative and not limiting of the scope of the invention which is defined by the appended claims. The embodiments shown accomplish various aspects and objects of the invention. It is appreciated that it is not possible to clearly show each element and aspect of the invention in a single figure, and as such, multiple figures are presented to separately illustrate the various details of the invention in greater clarity. Similarly, not every embodiment need accomplish all advantages of the present invention.

DETAILED DESCRIPTION

The invention and accompanying drawings will now be discussed so as to enable one skilled in the art to practice the present invention. The drawings and descriptions are exemplary of various aspects of the invention and are not intended to narrow the scope of the appended claims.

Figure 1:
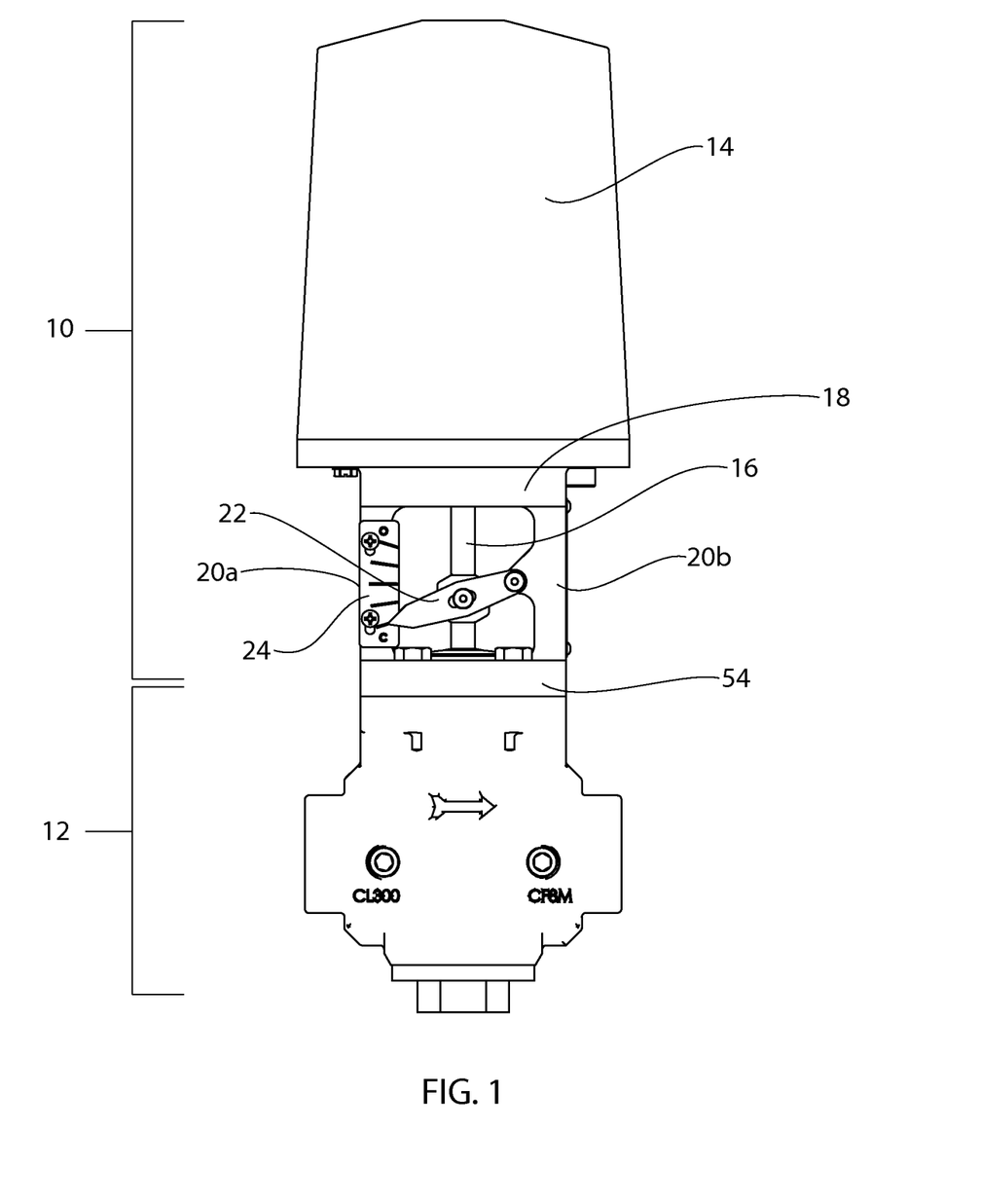
FIG. 1 shows a front perspective view of a control valve actuator assembly in accordance with one or more aspects of the present invention with the actuator assembly configured on a top side of a control valve.
Figure 2:
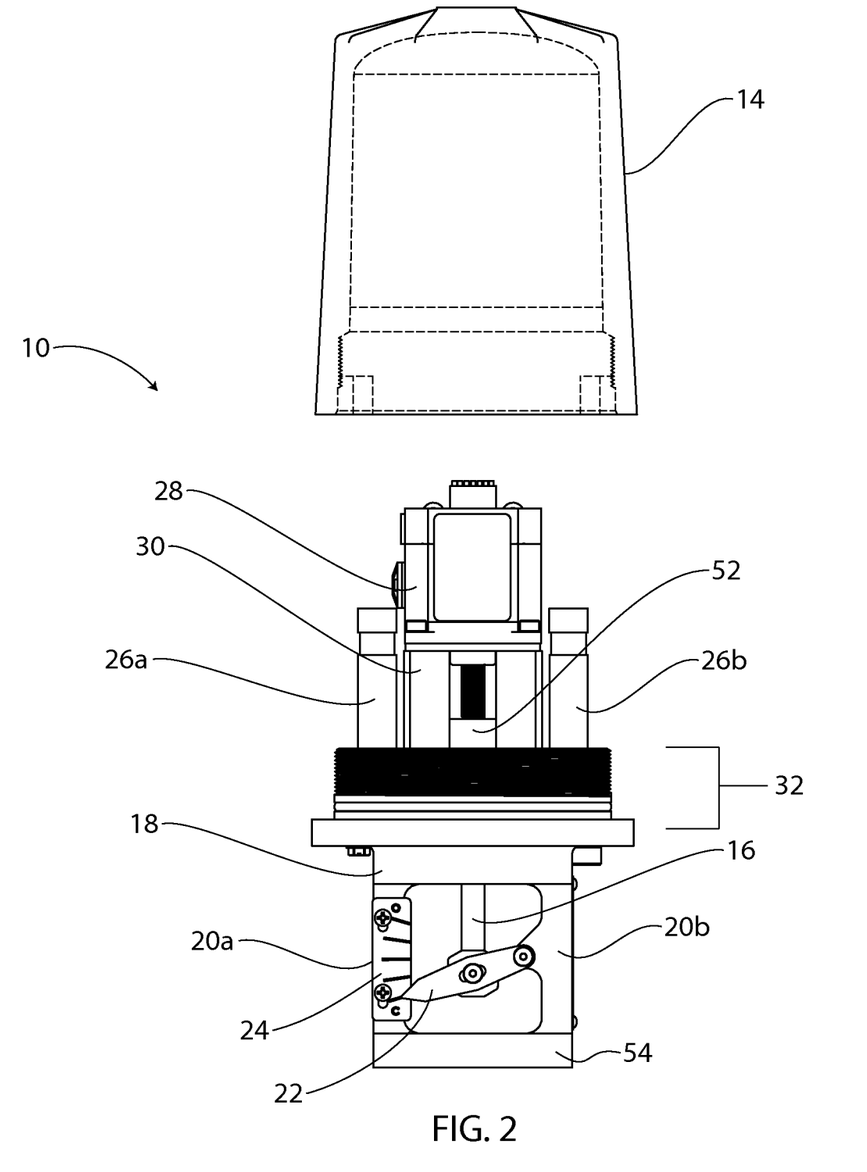
FIG. 2 shows a front perspective view of a control valve actuator assembly in accordance with one or more aspects of the present invention with explosion proof housing cover shown removed from the control valve actuator assembly.
Figure 3:
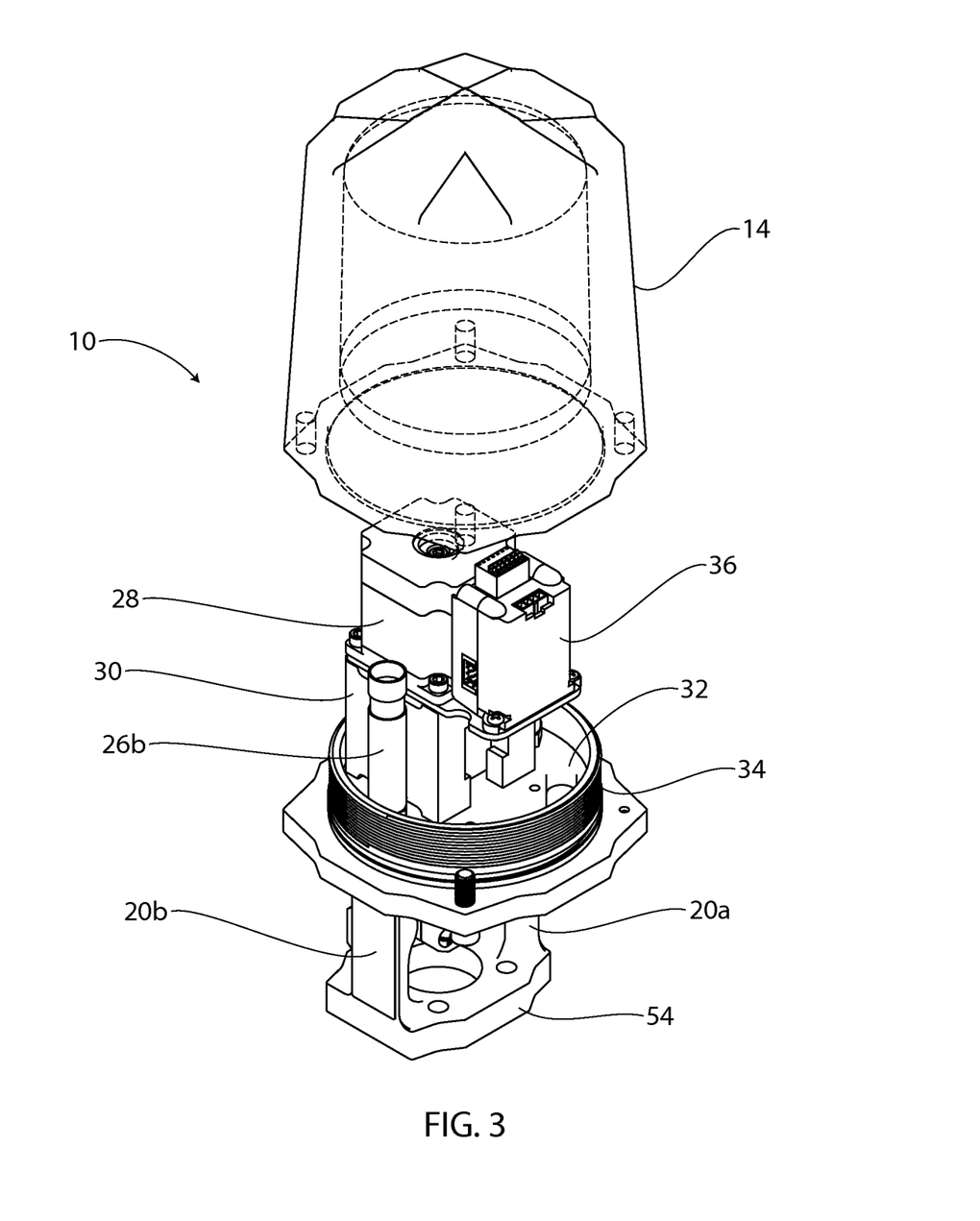
FIG. 3 shows a top angled perspective view of a control valve actuator assembly in accordance with one or more aspects of the present invention with explosion proof housing cover shown removed from the control valve actuator assembly.

Turning now to FIGS. 1 through 3, a control valve actuator assembly 10 is disclosed in accordance with the present invention for actuating a control valve 12 which may be used in a valve train for a burner application at an oil or gas well site. As shown in the Figures, the actuator assembly may be comprised of an explosion proof housing cover 14, a yoke 18, and a direct drive or stepper motor 28 that is operably connected to an actuator rod 16. The actuator rod is connected to a motor drive component of the control valve motor using a coupling block 52, which may be disposed in a motor guide mount 30. The motor may be mounted on top of the motor guide mount 30. A motor driver control 36 may be disposed adjacent to the control valve motor 28 and operably connected to the motor to permit the driver control 36 to direct the motor to move the actuator rod 16 up or down in response to signals received by the driver in response to pressure or temperature conditions within a burner application.

The motor guide mount 30 may be secured to the top side of a yoke 18. The yoke may include a mounting base section 32 connected to a valve mount section 54 by a plurality of yoke legs 20a, 20b. In a preferred embodiment, the yoke 18 may include two yoke legs 20a, 20b.

Figure 10:
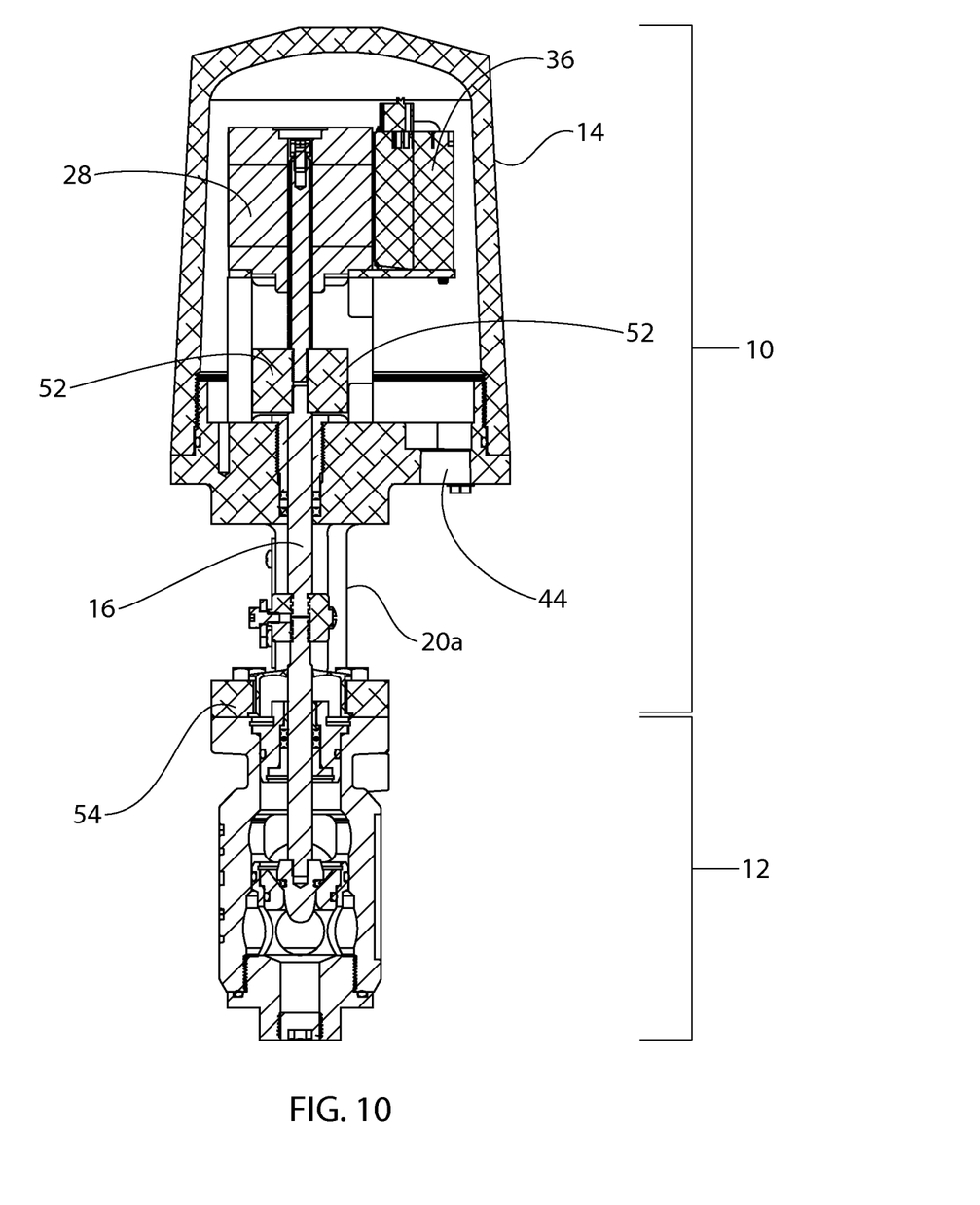
FIG. 10 shows a lateral side cutaway view of a control valve actuator assembly with the actuator assembly configured on the top side of a control valve in accordance with one or more aspects the present invention.

The control valve actuator assembly 10 of the present invention engages a control valve 12 that may be used in a valve train for a burner application at an oil or gas well site. The actuator rod 16 extends from the coupling block 52 through an opening in the top side of the mounting base 32 and extends between the yoke legs 20a, 20b where, as shown in FIG. 10, it may be secured to a valve stem using a stem clamp. A lever pivoting indicator arm 22 may be pivotally connected to the actuator rod 16 at the stem clamp, with a tail end of the indicator arm 22 pivotally connected to a first yoke leg 20b and the pointer end of the indicator arm 22 directed at a stroke indicator plate 24 attached to a second yoke leg 20a. The indicator arm assembly may be configured so that when the control valve 12 is closed the indicator arm 22 points to the closed position on the stroke indicator plate 24 and when the control valve 12 is open the indicator arm 22 may point to the open position on the stroke indicator plate 24.

The actuator assembly 10 may include an explosion proof enclosure or cover 14 to house and protect internal components of the actuator assembly which are enclosed within the housing cover 14. The actuator assembly housing cover 14 may be threaded and removably secures to the mounting base section 32 of the yoke by twisting the cover to thread it to the yoke 18. The control valve actuator housing cover may also be flame proof.

Figure 11:
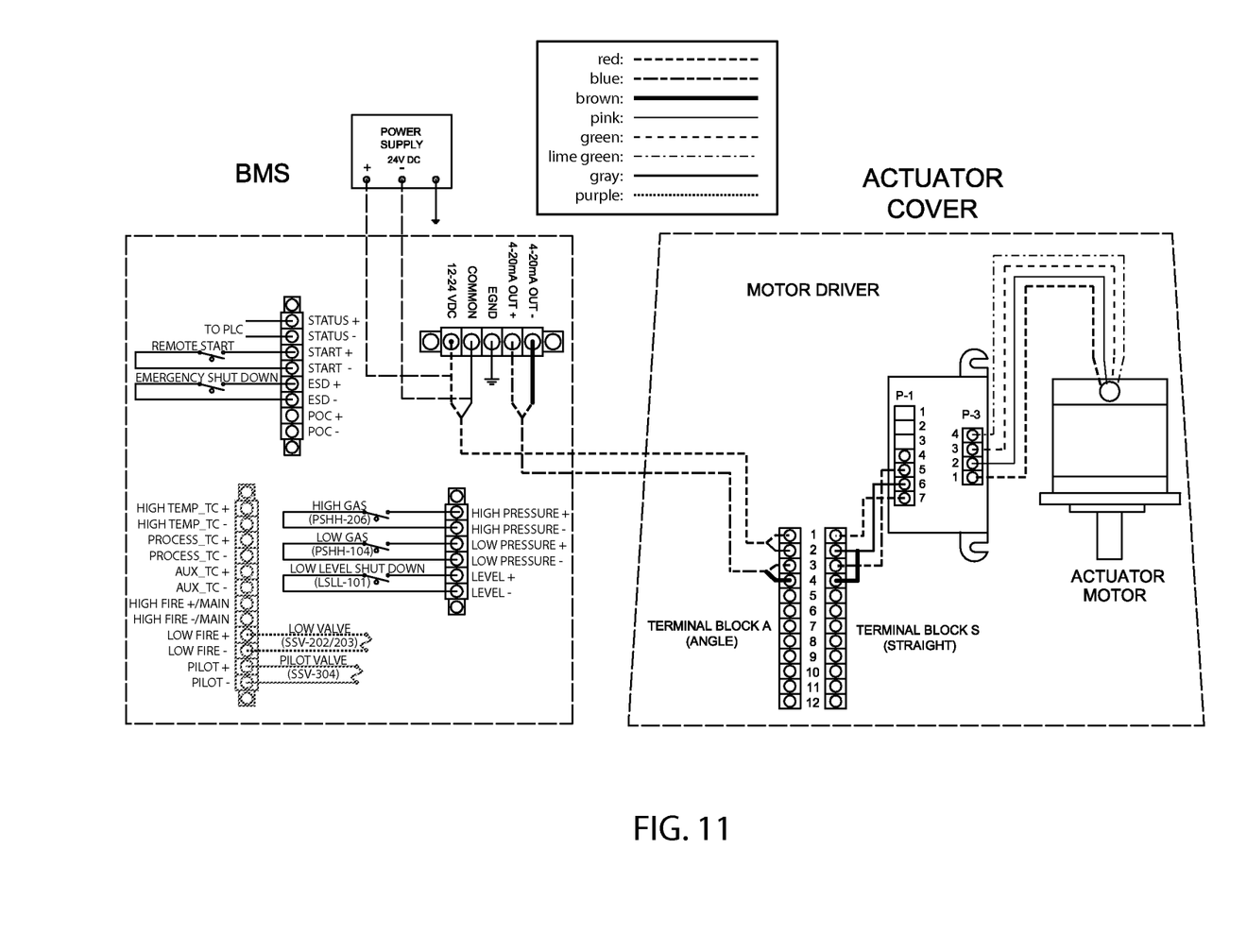
FIG. 11 shows a line diagram of an electrical configuration for single point connection of electronic components within the housing cover of the actuator assembly in accordance with one or more aspects the present invention.
Figure 12:
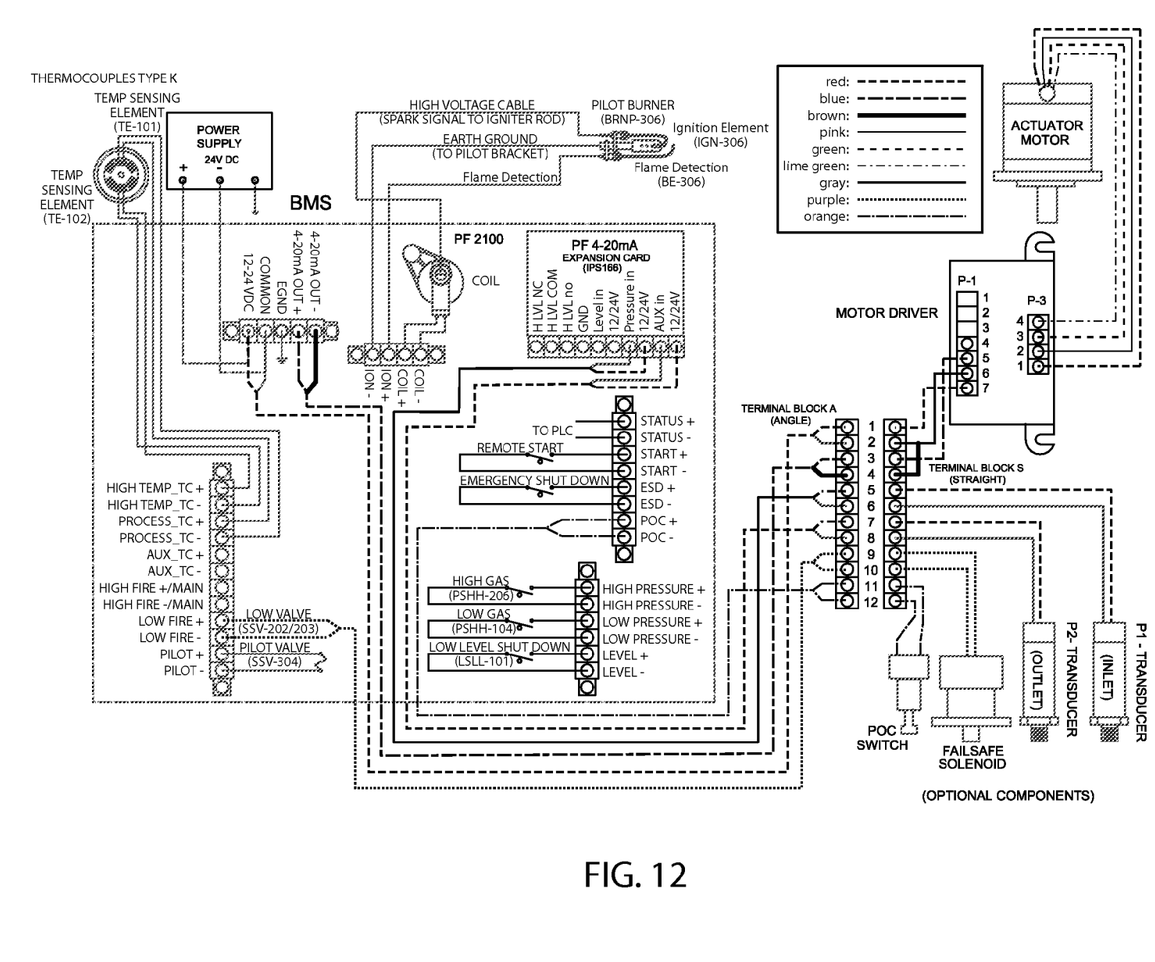
FIG. 12 shows a line diagram of an electrical configuration for single point connection of electronic components within the housing cover of the actuator assembly in accordance with one or more aspects the present invention.

The control valve actuator assembly 10 may be configured to enclose multiple electronic components within the explosion proof housing cover 14 when the housing cover 14 is secured to the yoke 18. The control valve actuator assembly 10 may also be configured with a single point electrical connection as shown in FIGS. 11 and 12. The electrical wiring to power the electrical components using a single point electrical connection may be extending into the control valve actuator assembly through a wire port 44 in the yoke 18 shown in FIGS. 4-5 and FIGS. 9-10. The single point electrical connection may also be enclosed within the explosion proof housing cover 14 when the housing cover 14 is secured to the yoke 18.

Electronic components of the control valve actuator assembly 10 may include the motor 28, electric pressure transducers 26a, 26b, the motor driver 36, switches, solenoids, position feedback sensors, and other sensors, all of which may be powered through a single point electrical connection and all of which along with the single point electric connection may be enclosed within the explosion proof housing cover 14 when the housing cover 14 is secured to the yoke 18. Enclosing electronic components of the control valve actuator assembly 10 together within an explosion proof housing cover 14 with a single point electrical connection permits simultaneous protection of multiple electronic components using a single explosion proof protective device. Simultaneous protection of the electronic components by a single explosion proof protective device permits use of less expensive electronic components which themselves are not individually explosion proof because they can all be protected under a single explosion proof housing cover 14. It also reduces labor costs and simplifies installation because it will not be required to conduct multiple safety feature installations in order to meet hazardous location safety requirements. The control valve actuator housing cover may also be flame proof and may meet flame proof protective requirements for hazardous locations in addition to meeting explosion proof requirements for hazardous locations.

Safety standards governing certifications identifying whether valve train components are considered explosion proof or flame proof protective in hazardous locations are known to those in the industry and provide parameters for determining whether or not valve train components, such as housing covers, pressure transducers, and other instruments used in a hazardous location are explosion proof or flame proof protective. Explosion proof standards for hazardous locations Class I, Division 1, Groups B, C, & D T4 for North America are provided by CSA C22.2 No. 30 and UL 1203. Flame proof standards for hazardous locations Class I, Zone 1, AEx d IIB+H2 T4 Gb are provided by CSA 60079-1 and ISA 60079-1. A housing cover may be verified as explosion proof by securing the housing cover to the yoke of the actuator assembly and filling the enclosure created thereby with an explosive gas mixture and then placing the housing cover and yoke enclosure within a test chamber which is also filled with an explosive gas mixture. The gas mixture within the housing cover and yoke enclosure is then ignited to verify that no flame or explosion propagates outside of the housing cover and yoke enclosure. This may be verified by the absence of ignition of the gas mixture outside of the housing cover and yoke enclosure.

The actuator housing cover 14, the yoke 18, the motor guide mount 30, and the coupling block 52 may be made of any sturdy or heat resistant material, such as aluminum, bronze, steel, and cast iron. These parts may be made using any number of methods available to one skilled in the art, including machining or casting. Some actuator assembly components, such as the mounting guides and the explosion proof housing cover 14, may also be made of a durable polymer or composite material.

Turning now to FIGS. 4 through 7, internally configured pressure transducers 26a, 26b, pressure monitoring channels 48a, 48b, and pressure ports 38a, 38b are shown. As can be seen form the Figures, pressure channels 48a, 48b for monitoring pressure changes may be internally integrated in the yoke and extend from the mounting base section 32 through the yoke legs 20a, 20b and then through the valve mount section 54 of the yoke 18. The openings as the valve mount 54 end of the pressure channels 48a, 48b forming pressure ports 38a, 38b may be connected to pressure ports on a control valve body in order to allow changes in pressure in the control valve to be sensed by electronic pressures transducers 26a, 26b at the mounting base 32 end of the pressure channels 48a, 48b.

Figure 5:
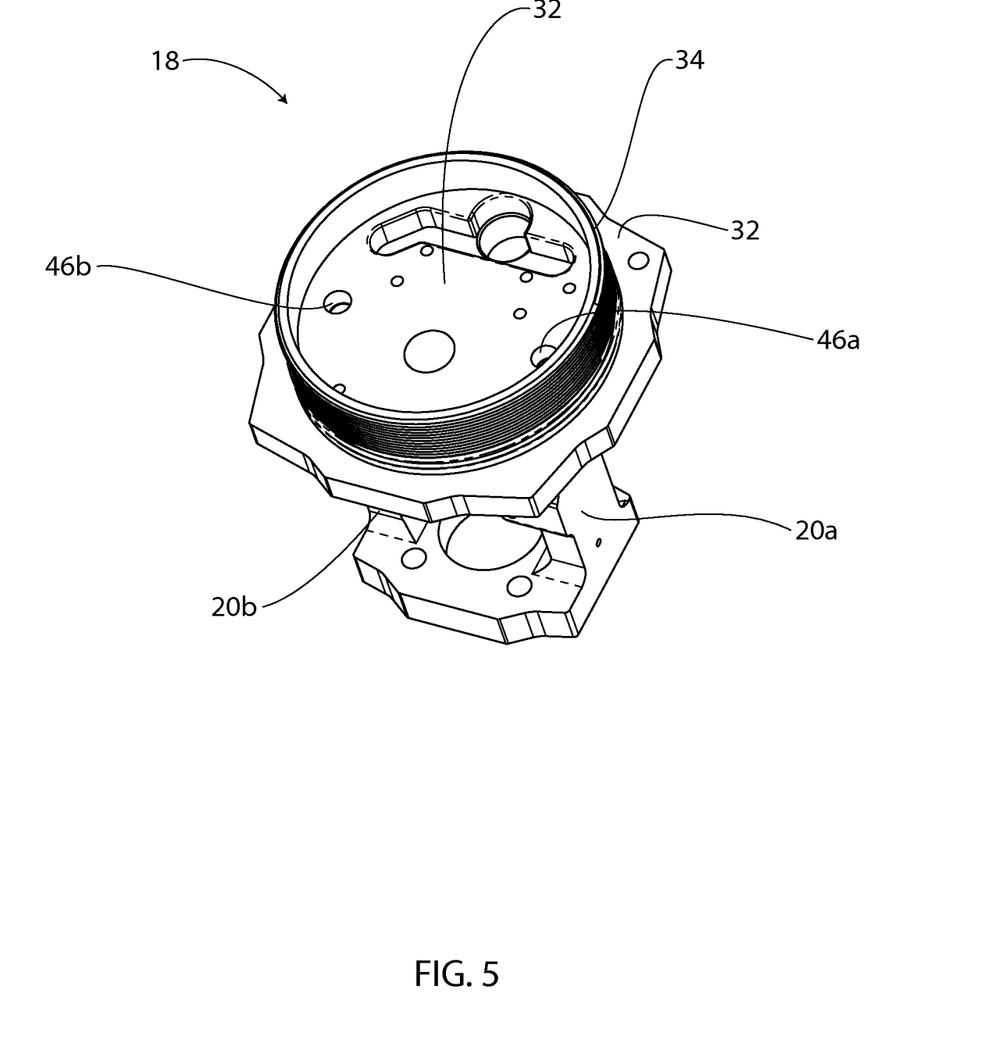
FIG. 5 shows a top angled perspective view of a control valve actuator yoke in accordance with one or more aspects of the present invention.
Figure 6:
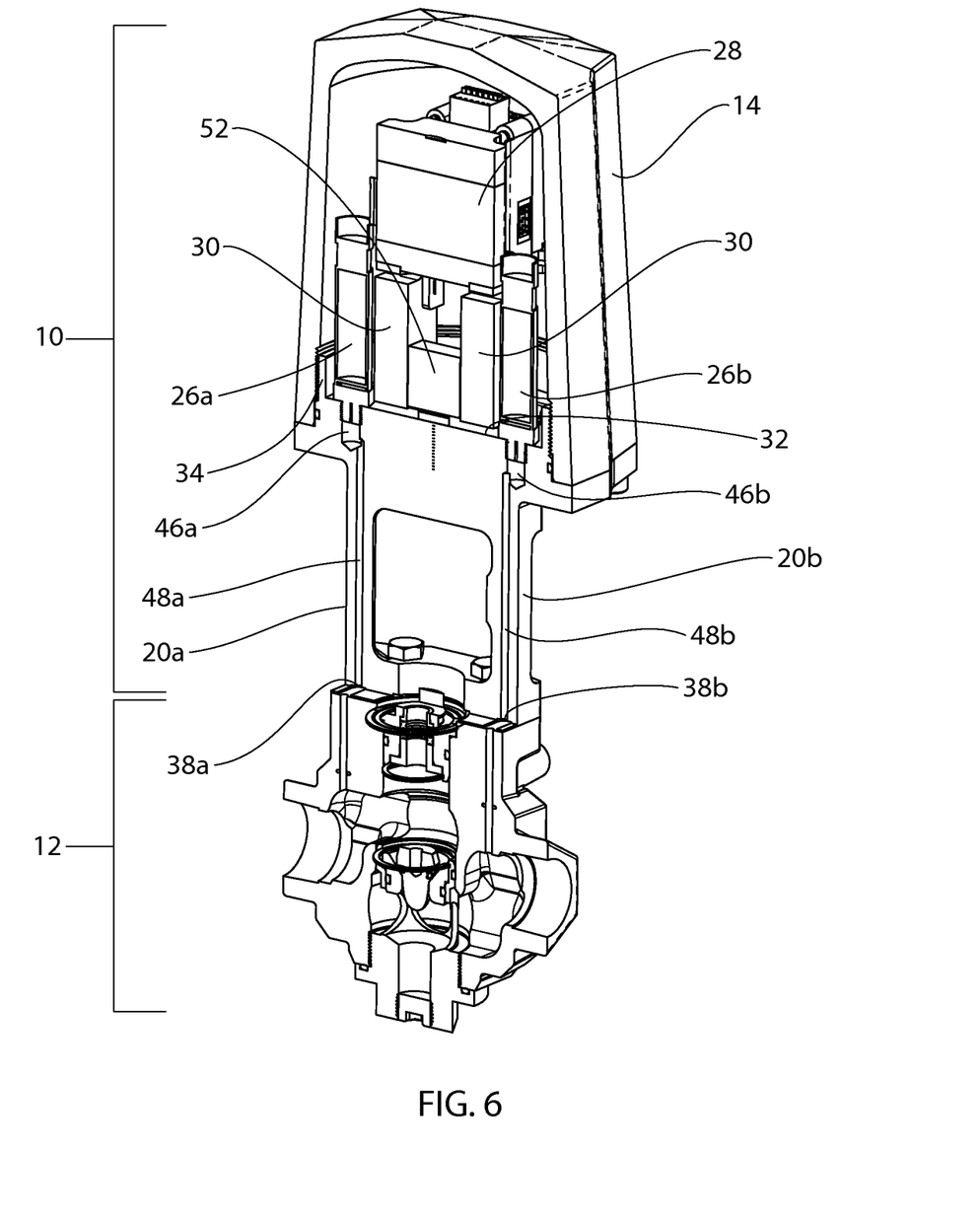
FIG. 6 shows a front angled cutaway view of a control valve actuator assembly with the actuator assembly configured on the top side of a control valve in accordance with one or more aspects of the present invention.
Figure 7:
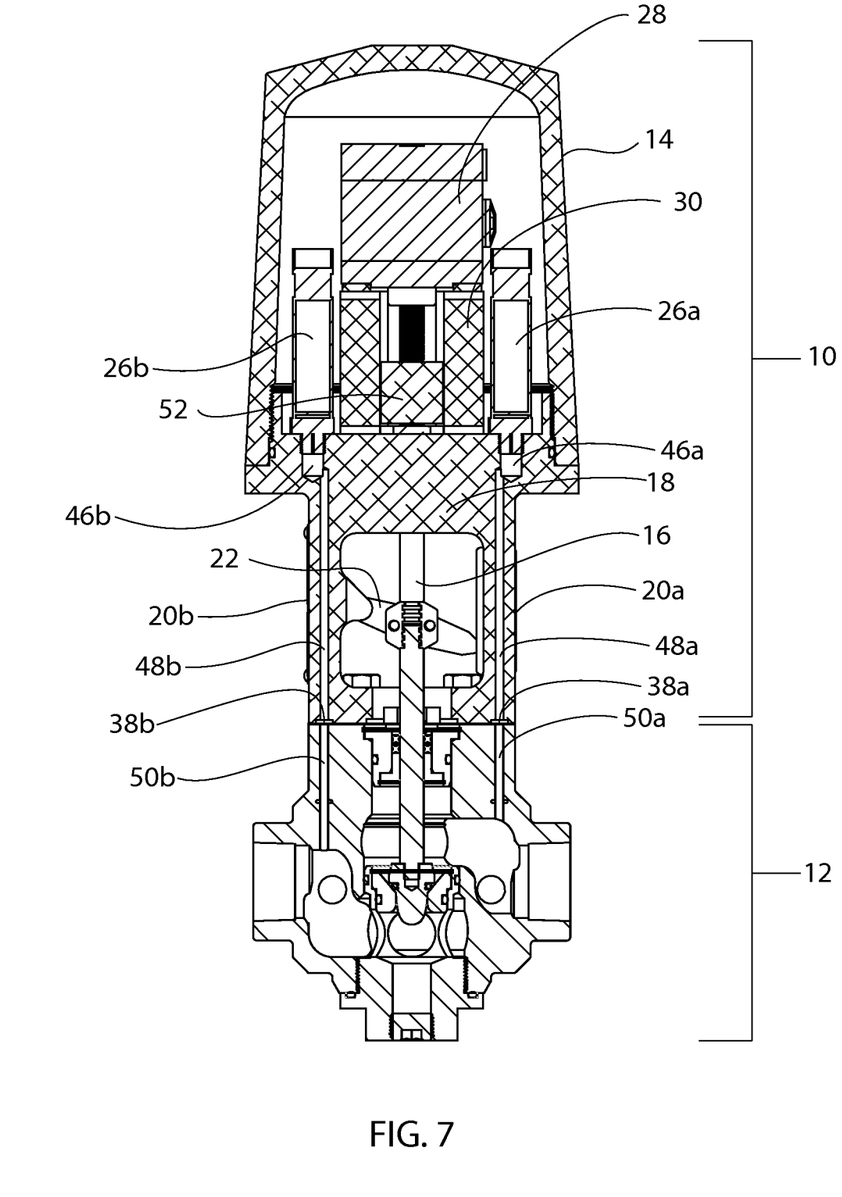
FIG. 7 shows a back side cutaway view of a control valve actuator assembly with the actuator assembly configured on the top side of a control valve in accordance with one or more aspects the present invention.
Figure 8:
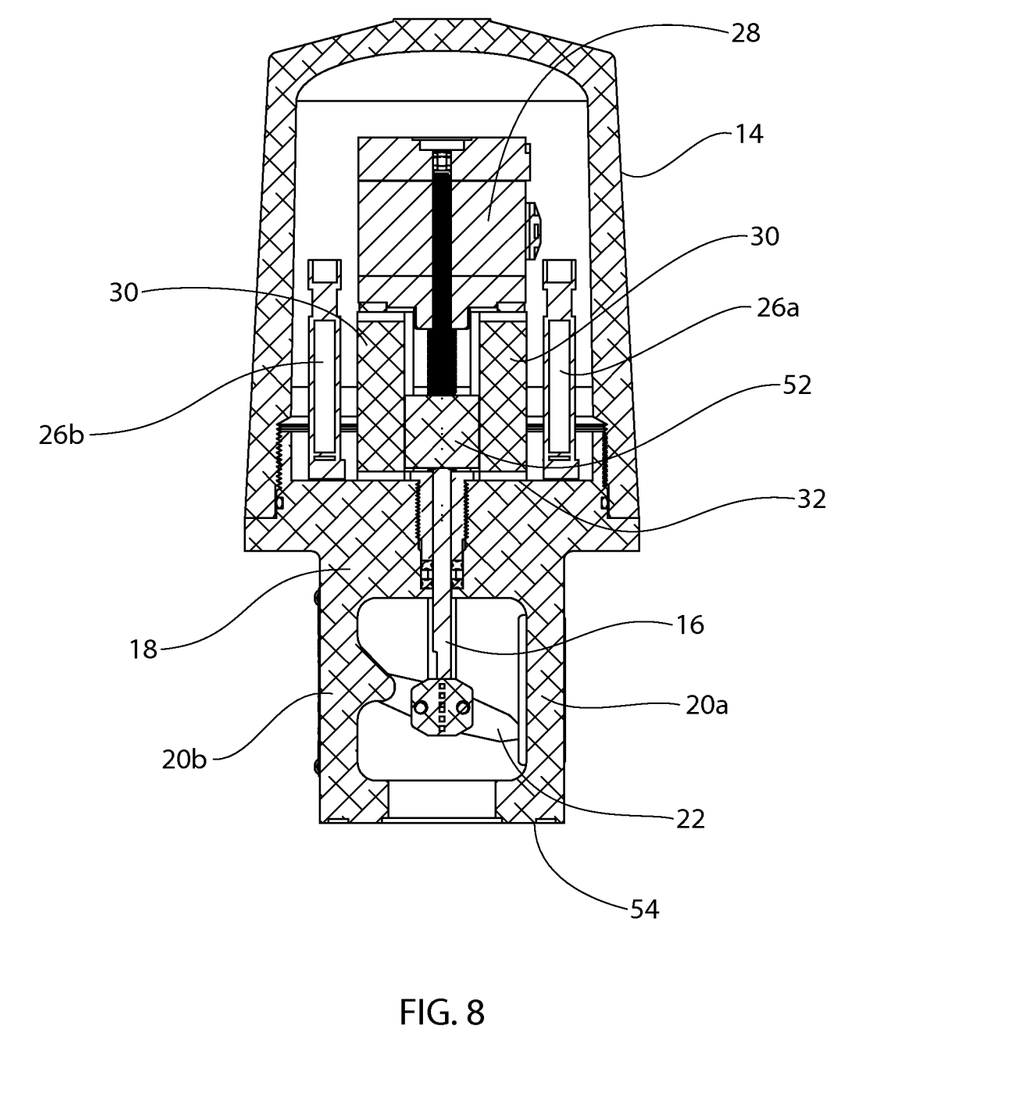
FIG. 8 shows a back side cutaway view of a control valve actuator assembly in accordance with one or more aspects the present invention.
Figure 9:
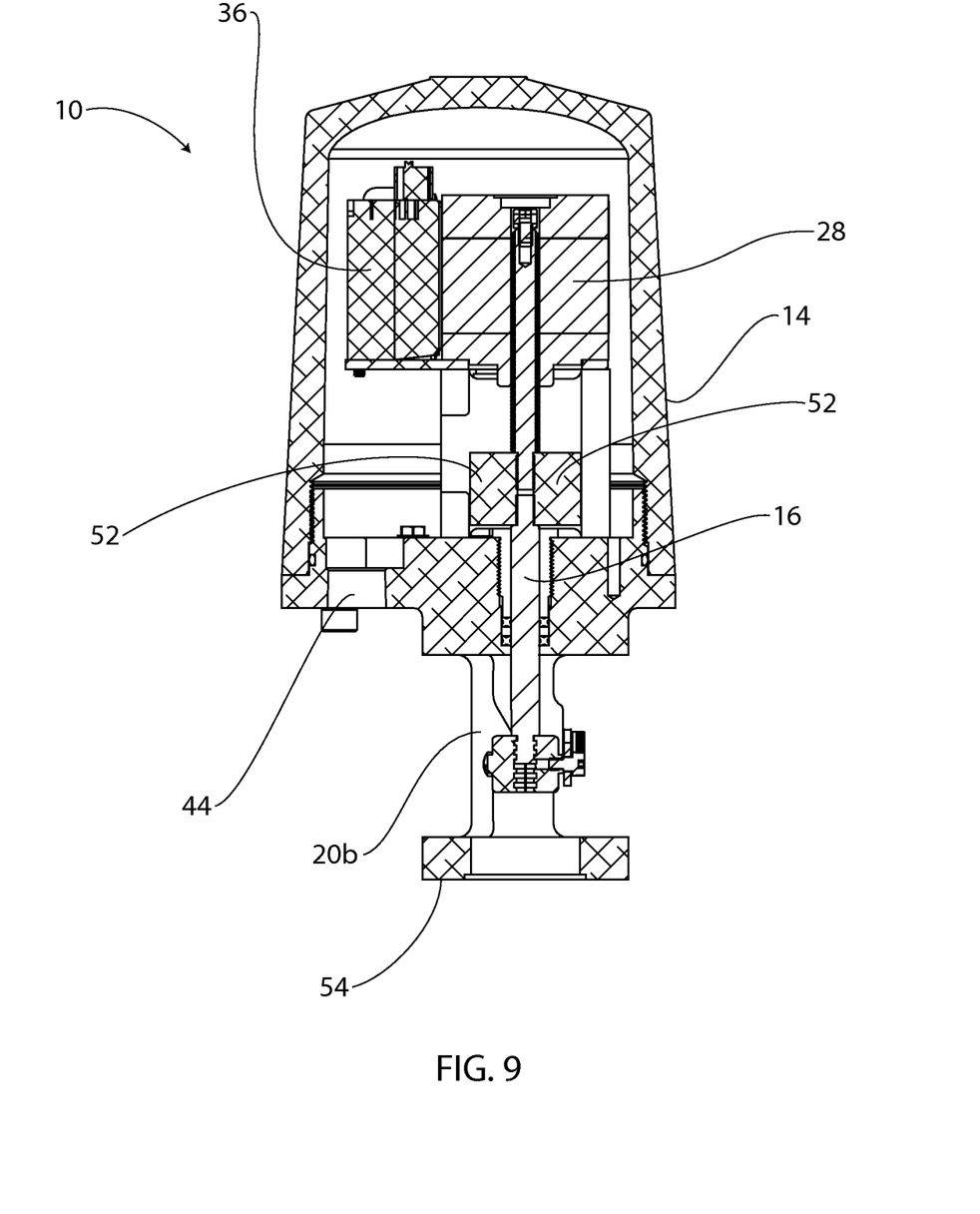
FIG. 9 shows a lateral side cutaway view of a control valve actuator assembly in accordance with one or more aspects the present invention.

As shown in FIG. 5, the mounting base section 32 of the yoke 18 may be configured with threaded holes 46a, 46b for securing electronic pressure transducers 26a, 26b on a top side of the mounting base 32. The pressure channels 48a, 48b may extend through the mounting base 32 into the threaded holes 46a, 46b for securing the pressure transducers 26a, 26b so that the pressure transducers 26a, 26b may sense pressure changes in the control valve 12.

The electronic pressure transducers 26a, 26b may sense pressure changes and be used for directing the control motor 28 to open or close the control valve 12 in order to increase or decrease the flow of fuel through the valve train. Other sensors in a burner management system used for managing fuel flow and combustion of a burner application may send signals to a control box, which may also direct the control motor 28 to open or close the control valve in response to conditions in the burner application, such as temperature changes.

As can be seen from the Figures, the explosion proof actuator assembly housing cover 14 may enclose the electronic pressure transducers when secured on the top side of the mounting base section 32 of the yoke 18. Configuring the pressure transducers and other electronic components inside of the actuator assembly cover protects them from external conditions, such as weather, jarring or bumping, and from explosions. Enclosing the pressure transducers within the explosion proof actuator assembly housing cover 14 also allows the use of transducers and other components which are not explosion proof, reducing the costs for transducers and other core components of the control valve actuator assembly.

Turning again to FIGS. 6 and 7, the valve mount section 54 of the yoke 18 may be securely mounted to the valve body of the control valve 12 using threaded mounting bolts which can be rotated into threaded holes in the valve body through holes in the valve mount 32. As also seen in FIG. 11, the control valve body also has internally disposed upstream and downstream pressure channels 50a, 50b configured so that the upstream and downstream pressure ports 38a, 38b of the yoke 18 may operably connect with the upstream and downstream pressure ports of the control valve body.

Figure 4:
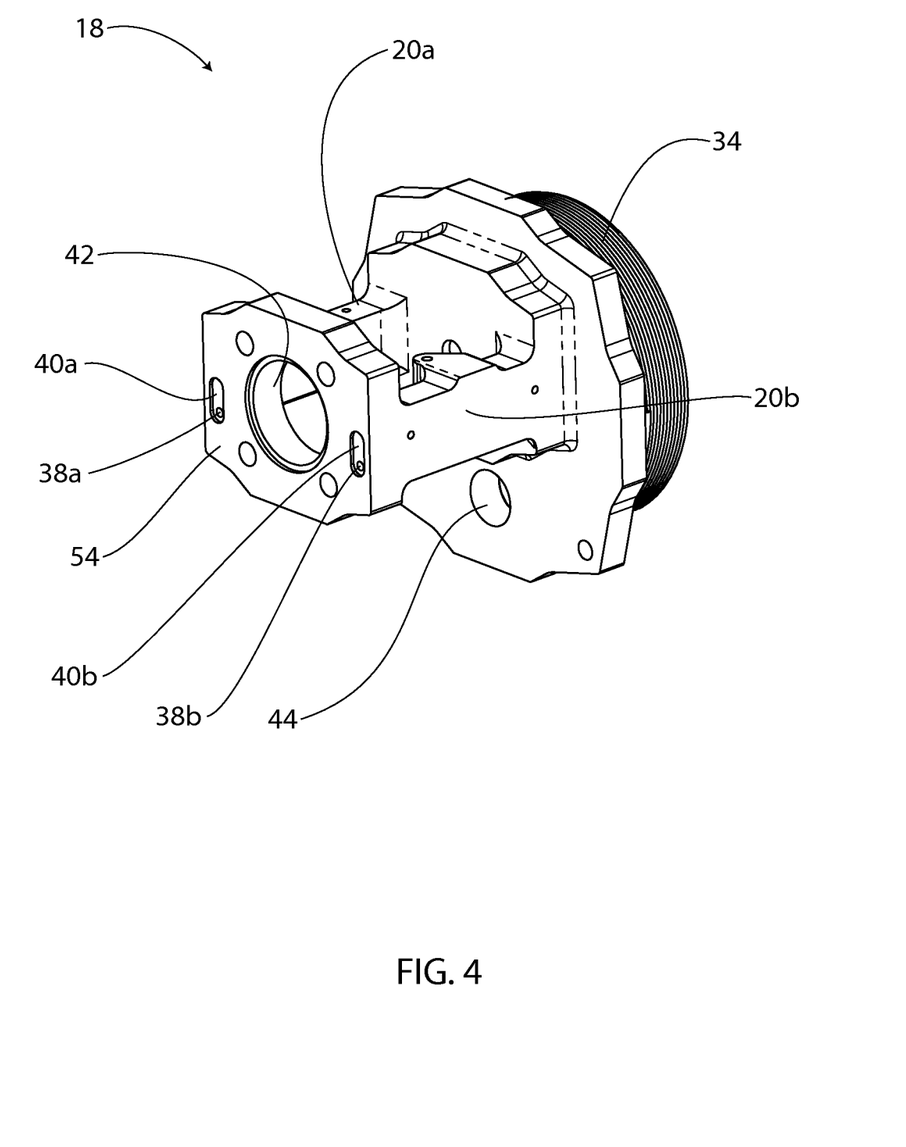
FIG. 4 shows a bottom angled perspective view of a control valve actuator yoke in accordance with one or more aspects of the present invention.

Turning now to FIG. 4, a perspective view of the yoke 18 showing a bottom side of the valve mount section 54 of the yoke 18 is shown. As can be seen from FIG. 4, two pressure channel ports 38a, 38b, including a downstream pressure port 38b and an upstream pressure port 38a, which may connect with the pressure channels 48a, 48b within the yoke legs 20a, 20b, may be disposed on the bottom side of the valve mount 54. As seen in the Figure, the pressure ports 38a, 38b on the bottom side of the valve mount 54 may be disposed within the recess of slotted o-ring grooves 40a, 40b. The unique oval O-ring grooves 40a, 40b on the bottom side of the yoke 18 allow the control valve actuator assembly 10 to be rotated 180 degrees to accommodate a right-to-left flow or left-to-right flow and maintain the stroke indicator visible for users.

There is thus disclosed an improved control valve actuator assembly having an explosion proof cover with internally configured pressure transducers, pressure channels internally integrated in the yoke legs, and with internal electrical wiring with single point connection for all electronic components. It will be appreciated that numerous changes may be made to the present invention without departing from the scope of the claims.

What is claimed is:

1. A control valve actuator assembly comprising:
a yoke having a mounting base near a first side of the yoke configured for mounting a control valve motor, a first yoke leg extending down from a bottom section of the mounting base at a first end of the first yoke leg, a second yoke leg extending down from a bottom section of the mounting base at a first end of the second yoke let, and a valve mount at a bottom side of the yoke connected at a top end of the valve mount to a second end of the first yoke leg and to a second end of the second yoke leg;
a first pressure channel internally disposed within the first yoke leg, said first pressure channel extending through the yoke from the mounting base through the first yoke leg to the valve mount; and a second pressure channel internally disposed within the second yoke leg, said first pressure channel extending through the yoke from the mounting base through the second yoke leg to the valve mount;

a first pressure transducer connected to the first pressure channel on a top side of the mounting base; and a second pressure transducer connected to the second pressure channel on a top side of the mounting base.

2. The control valve actuator assembly of claim 1, further comprising:

a control valve motor connected to the yoke adjacent to the mounting base; and a motor driver control operably connected to the control valve motor.

3. The control valve actuator assembly of claim 2, wherein the motor driver control is configured to receive control signals from one or more of the first pressure transducer and the second pressure transducer.

4. The control valve actuator assembly of claim 1, further comprising an explosion proof cover secured to the yoke adjacent to the mounting base wherein the explosion proof cover encloses the first pressure transduce and the second pressure transducer.

5. The control valve actuator assembly of claim 2, wherein the control valve motor is a direct drive motor.

6. The control valve actuator assembly of claim 2, wherein the control valve motor is a stepper motor.

7. The control valve actuator assembly of claim 1, wherein the yoke is comprised of a metal selected from the group consisting of machined aluminum, cast aluminum, bronze, stainless steel, and cast iron.

8. The control valve actuator assembly of claim 4, wherein the explosion proof cover is comprised of a metal selected from the group consisting of machined aluminum, cast aluminum, bronze, stainless steel, and cast iron.

9. The control valve actuator assembly of claim 4, wherein the explosion proof cover is comprised of a polymer material.

10. The control valve actuator assembly of claim 1, further comprising a single point electronic connector capable of connecting multiple electronic components to an electrical power source.

11. The control valve actuator assembly of claim 2, further comprising a single point electronic connector capable of connecting multiple electronic components to an electrical power source.

12. The control valve actuator assembly of claim 11, further comprising a position feedback sensor, wherein the control valve motor, the motor driver control, and the position feedback sensor are all operably connected to the single point electronic connector.

13. The control valve actuator assembly of claim 12, further comprising an explosion proof cover secured to the yoke adjacent to the mounting base wherein the control valve motor, the motor driver control, the position feedback sensor, and the single point electronic connector are all enclosed by the explosion proof cover.

* * * * *